(12) United States Patent
Jiang et al.

(10) Patent No.: US 11,822,547 B2
(45) Date of Patent: Nov. 21, 2023

(54) UPDATING SHARED AND INDEPENDENT MATERIALIZED VIEWS IN A MULTI-TENANT ENVIRONMENT

(71) Applicant: International Business Machines Corporation, Armonk, NY (US)

(72) Inventors: Peng Hui Jiang, Beijing (CN); Jun Su, Beijing (CN); Yan Lin Ren, Shanghai (CN); Zhang Li, Beijing (CN); Hong Qing Zhou, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 266 days.

(21) Appl. No.: 17/376,235

(22) Filed: Jul. 15, 2021

(65) Prior Publication Data

US 2023/0021006 A1    Jan. 19, 2023

(51) Int. Cl.
*G06F 16/2453* (2019.01)
*G06F 16/23* (2019.01)

(52) U.S. Cl.
CPC .... *G06F 16/24539* (2019.01); *G06F 16/2393* (2019.01)

(58) Field of Classification Search
CPC ................. G06F 16/24539; G06F 16/2393
See application file for complete search history.

(56) References Cited

U.S. PATENT DOCUMENTS

| | | |
|---|---|---|
| 6,449,606 B1 | 9/2002 | Witkowski |
| 7,007,006 B2 | 2/2006 | Zilio |
| 7,158,994 B1 * | 1/2007 | Smith ................ G06F 16/2445 707/999.102 |
| 2003/0093407 A1 * | 5/2003 | Cochrane .......... G06F 16/24539 |
| 2005/0102326 A1 * | 5/2005 | Peleg ...................... G06F 16/22 |
| 2006/0122964 A1 * | 6/2006 | Yu ........................ G06F 16/2393 |
| 2011/0137875 A1 * | 6/2011 | Ziauddin ............. G06F 16/2393 707/693 |
| 2013/0007069 A1 * | 1/2013 | Chaliparambil ........ G06Q 10/10 707/E17.005 |
| 2019/0065542 A1 * | 2/2019 | Baker .................... G06F 16/273 |
| 2019/0095498 A1 | 3/2019 | Srinivasan |
| 2019/0102467 A1 * | 4/2019 | Horen ............... G06F 16/24568 |
| 2019/0332698 A1 * | 10/2019 | Cho .................... G06F 16/2393 |
| 2020/0012645 A1 | 1/2020 | Collins |
| 2020/0242129 A1 * | 7/2020 | Botev ................. G06F 16/1805 |
| 2020/0334232 A1 * | 10/2020 | Arye ...................... G06F 16/215 |
| 2020/0334254 A1 | 10/2020 | Arye |
| 2020/0379994 A1 * | 12/2020 | Rajaperumal ....... G06F 16/2393 |
| 2021/0165783 A1 * | 6/2021 | Deshpande ....... G06F 16/24568 |

* cited by examiner

*Primary Examiner* — Mark D Featherstone
*Assistant Examiner* — Kweku William Halm
(74) *Attorney, Agent, or Firm* — Stephen R. Yoder (57) ABSTRACT

Shared materialized views are maintained during data changes to the primary data and during creation of new materialized views. Shared data stored for use by shared materialized views is distinguished from data stored by an independent materialized view. A view selector manages data updates to shared materialized views and corresponding mapping table. The view selector directs movement of data between a shared materialized view and an independent materialized view through the lifecycle of the materialized views.

12 Claims, 4 Drawing Sheets

UPDATING SHARED AND INDEPENDENT MATERIALIZED VIEWS IN A MULTI-TENANT ENVIRONMENT

BACKGROUND

The present invention relates generally to the field of database management, and more particularly to materialized views.

Multitenancy refers to shared cloud infrastructure that serves multiple tenants. Systems designed in such manner are often called shared. A tenant is a group of users who share a common access with specific privileges to the cloud infrastructure. Despite the fact that multiple tenants share resources, the tenant are not aware of each other and their data is kept totally separate. Multitenancy is an important component of cloud computing making cloud services far more practical. Multitenant architecture is a feature in many types of public cloud computing, including IaaS, PaaS, SaaS, containers, and serverless computing.

A materialized view is a pre-computed data set or database object derived from a query specification and stored for later use. For example, a materialized view may be a local copy of data located remotely, a subset of the rows and/or columns of a table or a join result, or a summary using an aggregate function. Because the data is pre-computed, querying a materialized view is faster than querying the base table of the materialized view. Materialized views are created and updated according to a primary dataset. Frequently run or sufficiently complex queries may benefit from the faster speed of querying a materialized view instead of querying the primary dataset. For example, materialized views may speed up aggregation, projection, and selection operations.

SUMMARY

According to an aspect of the present invention, there is a method, computer program product and/or system that performs the following operations (not necessarily in the following order): (i) monitoring a change data feed to a primary data store for a data change; (ii) responsive to detecting a data change, analyzing the data change for effect of the change on stored materialized views; (iii) identifying a set of materialized views that require an update due to the data change; and (iv) taking an update action on the set of materialized views.

According to another aspect of the present invention, there is a method, computer program product and/or system that performs the following operations (not necessarily in the following order): (i) monitoring a change data feed to a primary data store for a data change; (ii) responsive to detecting a data change, analyzing the data change for effect of the change on stored materialized views; (iii) identifying a set of materialized views that require an update due to the data change; (iv) taking an update action on the set of materialized views; and (v) determining the set of materialized views are shared materialized views. The update action includes: (a) updating derived data in a shared materialized view store based on the data change; and (b) updating the mapping table for the set of materialized views.

According to yet another an aspect of the present invention, there is a method, computer program product and/or system that performs the following operations (not necessarily in the following order): (i) collecting a set of queries against the primary data store; (ii) identifying candidate queries to request against a materialized view; (iii) determining to store query data derived from the candidate queries as either shared data or independent data; (iv) storing the shared data in a shared materialized view store for shared materialized views; (v) monitoring a change data feed to a primary data store for a data change; (vi) responsive to detecting a data change, analyzing the data change for effect of the change on stored materialized views; (vii) identifying a set of materialized views that require an update due to the data change; and (viii) taking an update action on the set of materialized views.

DETAILED DESCRIPTION

Shared materialized views are maintained during data changes to the primary data and during creation of new materialized views. Shared data stored for use by shared materialized views is distinguished from data stored by an independent materialized view. A view selector manages data updates to shared materialized views and corresponding mapping table. The view selector directs movement of data between a shared materialized view and an independent materialized view through the lifecycle of the materialized views. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
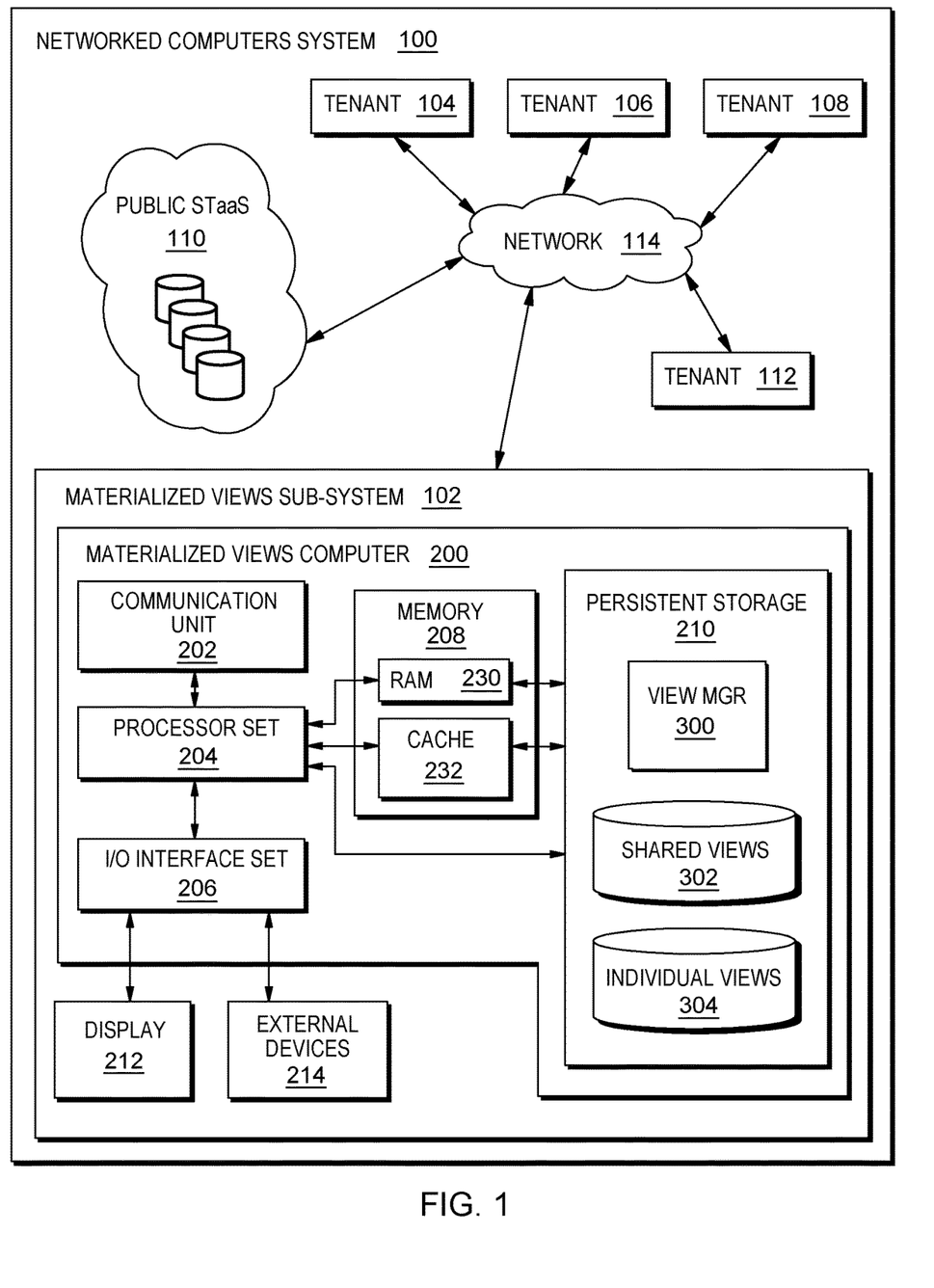
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: materialized views sub-system 102; tenant sub-systems 104, 106, 108, 112; public cloud storage as a service (STaaS); communication network 114; materialized views computer 200; communication unit 202; processor set 204; input/output (I/O) interface set 206; memory device 208; persistent storage device 210; display device 212; external device set 214; random access memory (RAM) devices 230; cache memory device 232; materialized view manager 300; shared materialized views store 302; and independent materialized views store 304.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications, and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Some embodiments of the present invention are directed to managing materialized views to reduce data storage and lower computing cost. Some embodiments of the present invention are directed to evaluating workload presented by multiple tenants and the data query characteristics from multiple tenants as they relate to the primary database and to responding to a change feed from the shared materialized views and the mapping table. Some embodiments of the present invention are directed to using a similarity factor to indicate where data for materialized views is best stored.

Figure 2:
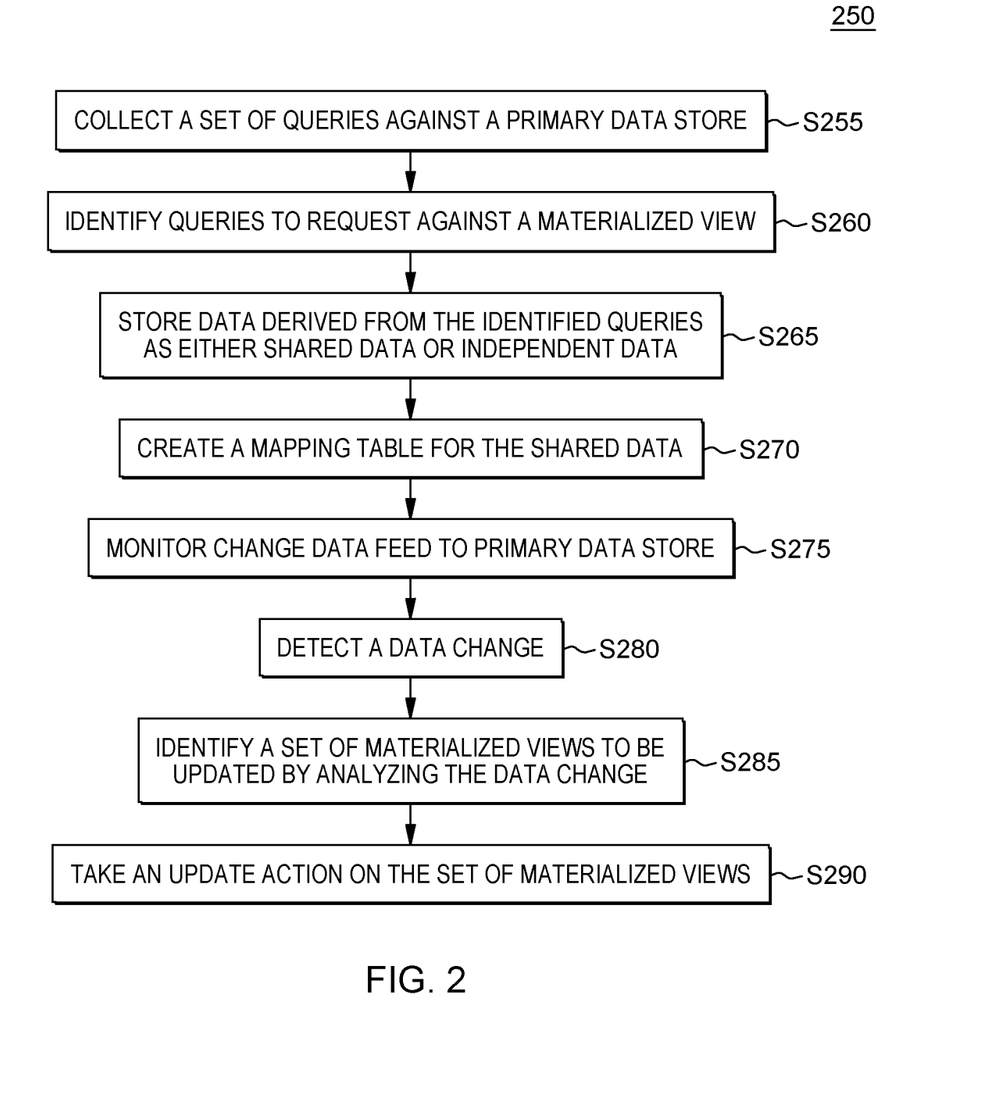
FIG. 2 is a flowchart showing a first embodiment method performed, at least in part, by the first embodiment system.
Figure 3:
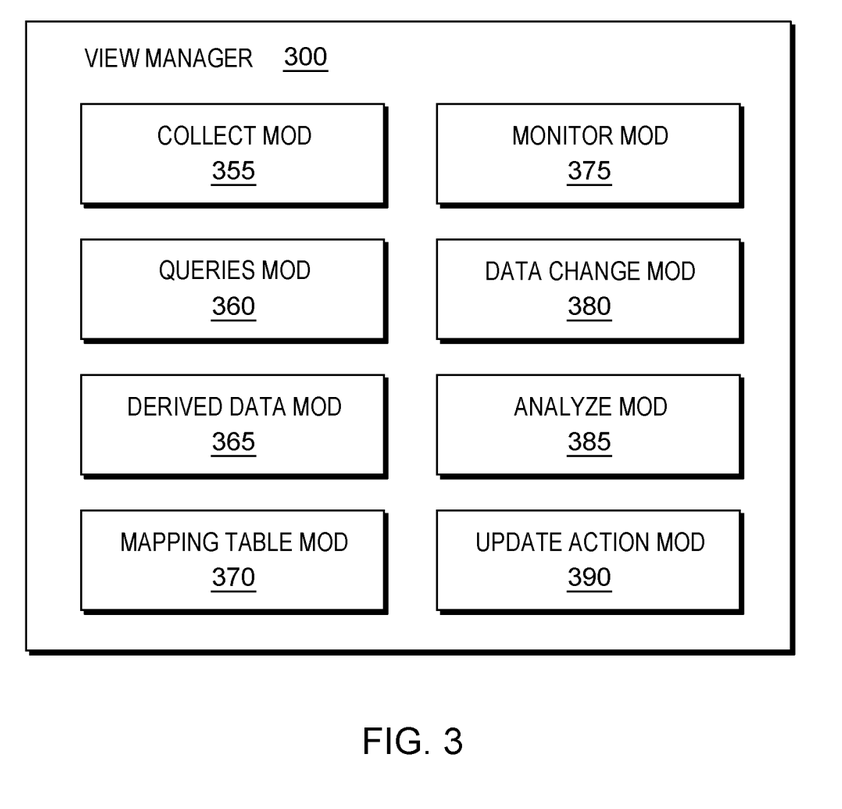
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where collect module ("mod") 355 collects a set of queries against a primary data store. The primary data store serves as the foundation on which queries are made. Oftentimes, a same query is made quite frequently such that the primary data does not change as often as the query is made. Other times, a query issued against the primary data is sufficiently complex that an undesirable delay exists between issuance of the query and the response. For complex queries, it may be helpful to pre-compute certain data sets responsive to the query. In that case, a materialized view is generated because querying the materialized view is faster than querying the base table (primary data) of the materialized view. In this step, the collect module collects the queries and statistical data from historic issuance of the queries to establish candidate queries for use in forming materialized views.

Processing proceeds to operation S260, where queries mod 360 identifies queries to request against a materialized view. Queries that may be identified by the queries mod include queries that are frequently run or that are identified as complex due to relatively lengthy response times. The queries mod analyzes the collected queries and corresponding statistical data to identify queries that may demonstrate performance improvements when issued against a materialized view. In this example, tenants 104, 106, 108, and 112 share access to primary storage in public STaaS 110 and each issue database queries against the primary storage (FIG. 1).

Processing proceeds to operation S265, where derived data mod 365 stores data derived from the identified queries as either shared data or independent data. Shared data is identified as derived data that is responsive to multiple collected queries, i.e. similar results from individual queries collected during system operation. Independent data is identified as derived data responsive to only one query or to only one query source, or tenant. In this example, shared data is stored in shared views store 302 and independent data is stored in independent views store 304 (FIG. 1). Some embodiments of the present invention establish shared materialized views even when a single tenant is the only basis for the query. Alternatively, a single tenant cannot, acting along, be the basis for creating a shared materialized view.

Processing proceeds to operation S270, where mapping table mod 370 creates a mapping table for the shared data. When derived data is stored as shared data, a mapping table is created to map the various materialized views that share the derived data. In this example, the mapping table (not shown) is stored in shared materialized view store 302 (FIG. 1).

Processing proceeds to operation S275, where monitor mod 375 monitors change data feed to primary data store. When data is the primary data store is being changed, a change data feed originating from the change source, such as a tenant of a multi-tenant environment, is directed to the primary data store. In this example, materialized views sub-system 102 monitors via monitor mod 375 communications between tenants 104, 106, 108, 112 and public cloud 110 (FIG. 1).

Processing proceeds to operation S280, where data change mod 380 detects a data change in the data change feed of the primary data store. When a data change is detected, operations begin to analyze the data change for its impact on the pre-computed derived data of the materialized views. When the primary data changes, it is possible that the derived data from queries will change as well. In this example, a data change sent from tenant sub-system 104 to public cloud 110 is detected (FIG. 1).

Processing proceeds to operation S285, where analyze mod 385 identifies a set of materialized views to be updated by analyzing the data change. The set of materialized views that is identified may include only one independent materialized view. When the set of materialized views includes multiple materialized views, the shared materialized view will be subject to an update action.

Processing ends with operation S290, where update action mod 390 takes an update action on the set of materialized views. Update actions may be complex with multiple steps and further analysis. Taking a particular update action depends on whether the data change is adding a data operation, deleting a data operation, or updating a data operation. Update actions may include: (i) a shared view update and a corresponding mapping table update; (ii) an independent view update; (iii) moving updated derived data between shared materialized view and independent materialized view; and/or (iv) deleting updated derived data from the shared view and/or the independent view.

Moving updated derived data between shared materialized view and independent materialized view is the update action when the data change leads to a shared materialized view only serving one query or tenant. When that occurs, the derived data is moved from a shared materialized view to an independent materialized view. Another moving derived data may address is when a data change is made that affects multiple materialized views when it previously only affected one. When that situation arises, the derived data is moved from an independent materialized view to a shared materialized view and the mapping table is updated to include the newly transferred derived data for access by multiple queries.

III. Further Comments and/or Embodiments

Some embodiments of the present invention recognize the following facts, potential problems and/or potential areas for improvement with respect to the current state of the art: (i) for a given cloud database, different tenants may create different materialized views to satisfy their particular requirements; (ii) although materialized views are precomputed views that periodically cache results of a query for increased performance and efficiency, the use of materialized views increases data storage volume and the cost of synchronization; and/or (iii) considering that materialized views are updated through a batch process for large data volumes of a database, multiple copies of the same data will drive costs up of both storage and processing.

An embodiment of a possible hardware and software environment for software and/or methods according to the present invention will now be described in detail with reference to the FIG. 4.

Figure 4:
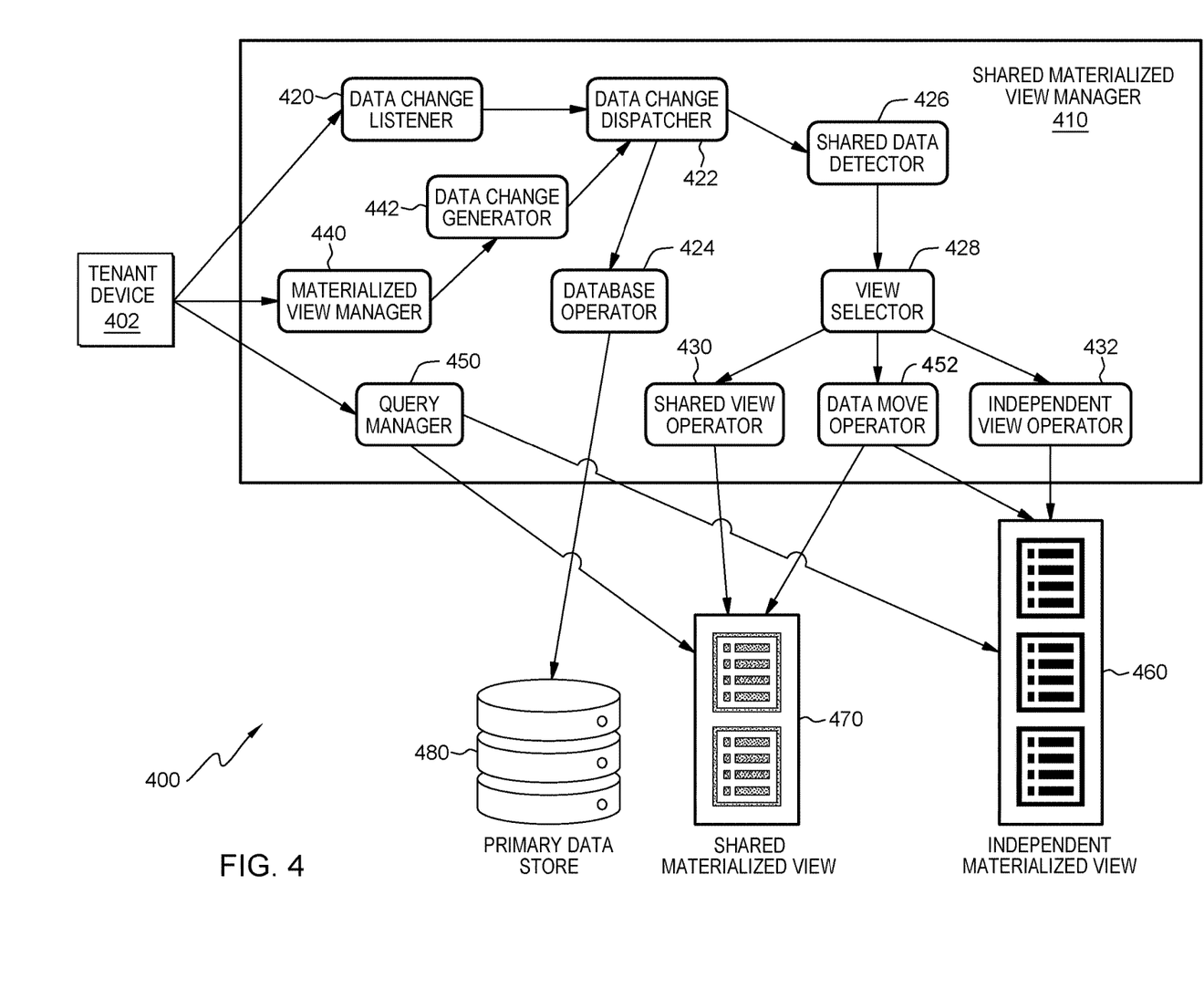
FIG. 4 is a block diagram view of a second embodiment of a system according to the present invention.

FIG. 4 is a functional block diagram illustrating various portions of networked computers system 400, including: tenant device sub-system 402; shared materialized view manager 410; data change listener 420; data change dispatcher 422; database operator 424; shared data detector 426; view selector 428; shared view operator 430; independent view operator 432; materialized view manager 440; data change generator 442; query manager 450; data move operator 452; independent materialized view 460; shared materialized view 470; and primary data store 480. This method and associated software will now be discussed, over the course of the following paragraphs, with extensive reference to FIG. 4. Shared materialized view manager 410 may be implemented as software in a networked computers system in a similar way as materialized view manager 300 is implemented in networked computers system 100 (FIG. 1).

Some embodiments of the present invention are directed to providing a shared materialized view using, for example, shared materialized view manager 410. Shared materialized view 470 stores the shared data for multiple materialized views, and includes: (i) view data for view access; (ii) a mapping table, such as a bit map table, indicating what data will be used for which materialized view; and (iii) the unique data ID along rows of the bit map table. Independent materialized view 460 stores only the data that is for a single materialized view.

Some embodiments of the present invention are directed to processing data changes directed to, for example, primary data store 480. Processing a data change may include reading the data change feed of primary data, including any CRUD (Create, Read, Update, and Delete) operations using, for example, data change listener 420. The data change feed may originate from tenant device sub-system 402. When a data change is identified in the data change feed, data change dispatcher 422 directly makes the corresponding update on primary data store. Shared data detector 426 evaluates the identified change data for whether the data change will be present in multiple materialized views or only one view, if any. Upon determining that the data change will be present in multiple materialized views, view selector 428 directs shared view operator 430 to write the data to shared materialized view store 470 including making an update to the mapping table. Upon determining that the data change will only be present in a single materialized view, view selector 428 directs independent view operator 432 to write the data to independent materialized view store 460.

Some embodiments of the present invention are directed to analyzing the identified data change for the primary data. Analysis performed by shared data detector 426 varies according to whether the change is adding a data operation, deleting a data operation, or updating a data operation.

When adding a data operation is the identified change, the shared data detector verifies whether the newly added data will satisfy the criteria of multiple materialized views. When the change satisfies the criteria of multiple materialized views, view selector 428 is notified to select shared view operator 430 for processing the change. When the change only satisfies the criteria of a single materialized view, the view selector is notified to select independent view operator 432.

When deleting a data operation is the identified change, shared data detector 426 checks where the data to be deleted in the materialized view is actually stored. If the data to be deleted is stored in shared materialized view store 470, the corresponding mapping table is updated. If the data to be deleted is stored in independent materialized view store 460, the row corresponding to the deleted data is deleted from an independent materialized view.

When an updating data operation is the identified change, the shared data detector follows the order of first, deleting data operations, and second, adding data operations. In order to reduce throttling of data in the different materialized views, a similarity factor, or score, is generated to indicate whether the updated data will be added to a shared materialized view instead of an independent materialized view. The updated data is compared to the deleted data as a data pair for purposes of determining storage location of the update data. The decision is based on the following similarity factor:

$$Score = S_i \times W_i,$$

where Score is the similarity factor, S represents a similarity related to a data pair, W represents a weight assigned to the data pair, and $1 \leq i \leq N$, where N represents the number of similarities related to the data pair.

Similarity may be on a scale of 1-5, where 5 is the not similar at all. Each point of similarity for the data pair is considered individually. The weight assigned relates to a pre-defined significance level the corresponding data point has on the query. Typically, the significance level is a range from 0.1-1.0, where 1 is the highest significance level. The number of total similarities is determined by shared data detector 426 when analyzing the identified data change for the primary data.

Some embodiments of the present invention are directed to identifying whether a shared materialized view or an independent materialized view is to be updated. View selector 428 directs a view update request to different materialized view operators, whether shared view operator 430 or independent view operator 432. Further, the view selector triggers data move operator 452 to run in the background.

Some embodiments of the present invention are directed to changing or updating materialized views. The process for materialized view changes includes: (i) materialized view manager 440 manages the lifecycle of each materialized view, including CRUD (Create, Read, Update, and Delete) of the materialized views; (ii) data change generator 442 aligns changes or updates to materialized views with the primary data store; (iii) shared data detector 426 evaluates the identified change data for whether the data change will be present in multiple materialized views or only one view, if any. Upon determining that the data change will be present in multiple materialized views, view selector 428 directs shared view operator 430 to write the data to shared materialized view store 470 including making an update to the mapping table. Upon determining that the data change will only be present in a single materialized view, view selector 428 directs independent view operator 432 to write the data to independent materialized view store 460.

Some embodiments of the present invention are directed to processing a query against a materialized view, whether shared view or independent view. The process may include: (i) query manager 450 issuing a request against both the shared materialized view and the independent materialized view; (ii) the query manager combines the results of the query from shared materialized view 470 and the independent materialized view 460; (iii) the query manager saves the bookmark from both the shared materialized view and the independent materialized view to support pagination.

Some embodiments of the present invention are directed to handling data movement between materialized view stores. In this example, the movement between materialized view stores is bidirectional. The stored data is moved by data move operator 452 according to certain strategies. For example, stored data is moved from the independent materialized view to the shared materialized view when multiple views share the same data or record. Stored data is moved from the shared materialized view to the independent materialized view when currently shared data is determined to be only used by one query. The stored data is then removed from the shared materialized view and the independent materialized view when the data is no longer used by any view.

Some embodiments of the present invention are directed to creating and using shared materialized views in a multi-tenant environment including at least one of the following steps: (i) evaluate workload presented by multiple tenants to the primary database; (ii) evaluate the data query characteristics from multiple tenants to the primary database; (iii) respond to the change feed for primary data to add, update, and/or delete data from shared materialized views, independent materialized views, and a mapping table; (iv) calculate a similarity factor to determine where data in the materialized views is to be stored; (v) monitor the lifecycle of the materialized views, including CRUD (Create, Read, Update, and Delete), to replicate the updates to the primary data store for the data that is stored for the shared materialized views and independent materialized views; (vi) perform query against materialized views using bookmark respectively from shared materialized views and independent materialized view; and/or (vii) move data among materialized views and clean up orphan data by using the data movement operator.

Some embodiments of the present invention do more than generate materialized views from a source table and sharing them between accounts of a multiple tenant database system for allowing multiple parties and/or tenants to access them without copying and automatically updating them over shared data.

Some embodiments of the present invention do more than allow a receiver account to access shared resources (materialized view) in a provider account without creating a copy of a data resource in the receiver account.

Some embodiments of the present invention are directed to monitoring creation of new materialized view to update the primary data store and to update, as needed, the stored data of the shared materialized views and the independent materialized views;

Some embodiments of the present invention are directed to performing query against materialized views using bookmarks from the shared materialized views and/or the independent materialized views; and Some embodiments of the present invention are directed to moving data among materialized views and cleaning up orphan data using a data movement operator.

Some embodiments of the present invention are directed to multiple layers of materialized views such that one materialized view can be not shared by multiple materialized views.

Some embodiments of the present invention are directed to using shared materialized views to save cost of storing materialized views.

Some embodiments of the present invention are directed to using shared materialized views and independent materialized view to construct multiple layers of materialized views for sharing of materialized views.

Some embodiments of the present invention may include one, or more, of the following features, characteristics and/or advantages: (i) multiple layer of materialized views are introduced to better use shared data and to greatly save cost of storing materialized views; (ii) materialized views may be shared for the use of a signal tenant when there is shared data in these materialized views; (iii) requires less storage for materialized views than conventional processes; (iv) fewer updates of materialized views; (v) reduces conflicts of updating materialized views with primary data; and/or (vi) the independent materialized views only store the data for single materialized views.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    monitoring a change data feed to a primary data store for an update to a data operation;
    responsive to detecting the update, analyzing the update for effect on stored materialized views;
    identifying a set of stored materialized views that require updating due to the update to the data operation, the set of stored materialized views including shared materialized views using shared data stored in a shared materialized view store, and an independent materialized view using derived data; and
    taking an update action on the set of stored materialized views, the update action including:
        moving the derived data to the shared materialized view store; and
        updating a mapping table for the shared data to include the derived data for the independent materialized view.

2. The computer-implemented method of claim 1, wherein the update to a data operation is one of adding a data operation and deleting a data operation.

3. The computer-implemented method of claim 1, further comprising:
    collecting a set of queries against the primary data store;
    identifying candidate queries to request against a materialized view;
    determining to store query data derived from the candidate queries as either shared data or independent data; and
    storing the shared data in the shared materialized view store for shared materialized views.

4. The computer-implemented method of claim 3, further comprising:
    creating the mapping table for the shared data; and
    storing the mapping table in the shared materialized view store.

5. A computer program product comprising a computer-readable storage medium having a set of instructions stored therein which, when executed by a processor, causes the processor to perform a method comprising:
    monitoring a change data feed to a primary data store for an update to a data operation;
    responsive to detecting the update, analyzing the update for effect on stored materialized views;
    identifying a set of stored materialized views that require updating due to the update to the data operation, the set of stored materialized views including shared materialized views using shared data stored in a shared materialized view store, and an independent materialized view using derived data; and taking an update action on the set of stored materialized views, the update action including:
   moving the derived data to the shared materialized view store; and
   updating a mapping table for the shared data to include the derived data for the independent materialized view.

6. The computer program product of claim 5, wherein the update to a data operation is one of adding a data operation and deleting a data operation.

7. The computer program product of claim 5, further comprising:
   collecting a set of queries against the primary data store;
   identifying candidate queries to request against a materialized view;
   determining to store query data derived from the candidate queries as either shared data or independent data; and
   storing the shared data in the shared materialized view store for shared materialized views.

8. The computer program product of claim 7, further comprising:
   creating the mapping table for the shared data; and
   storing the mapping table in the shared materialized view store.

9. A computer system comprising:
   a processor set; and
   a computer readable storage medium;
   wherein:
   the processor set is structured, located, connected, and/or programmed to run program instructions stored on the computer readable storage medium; and
   the program instructions which, when executed by the processor set, cause the processor set to perform a method comprising:
      monitoring a change data feed to a primary data store for an update to a data operation;
      responsive to detecting the update, analyzing the update for effect of the change on stored materialized views;
      identifying a set of stored materialized views that require updating due to the update to the data operation, the set of stored materialized views including shared materialized views using shared data stored in a shared materialized view store, and an independent materialized view using derived data; and
      taking an update action on the set of stored materialized views, the update action including:
         moving the derived data to the shared materialized view store; and
         updating a mapping table for the shared data to include the derived data for the independent materialized view.

10. The computer system of claim 9, wherein the update to a data operation is one of adding a data operation and deleting a data operation.

11. The computer system of claim 9, further comprising:
collecting a set of queries against the primary data store;
identifying candidate queries to request against a materialized view;
determining to store query data derived from the candidate queries as either shared data or independent data; and
storing the shared data in the shared materialized view store for shared materialized views.

12. The computer system of claim 11, further comprising:
creating the mapping table for the shared data; and
storing the mapping table in the shared materialized view store.

\* \* \* \* \*